United States Patent [19]

Kjell-Berger

[11] 3,958,919

[45] May 25, 1976

[54] METHOD AT MELTING IN A SHAFT FURNACE

[75] Inventor: Sven Olof Kjell Kjell-Berger, Skovde, Sweden

[73] Assignee: Rockwool Aktiebolaget, Sweden

[22] Filed: June 10, 1974

[21] Appl. No.: 478,098

[30] Foreign Application Priority Data

June 18, 1973 Sweden.............................. 7308571

[52] U.S. Cl.................................. 432/14; 266/144;
432/15; 432/99; 432/13; 266/156; 266/200
[51] Int. Cl.²......................................... F27B 15/00
[58] Field of Search................... 432/13, 14, 15, 21,
432/24, 58, 72, 73, 95–97, 99–102; 266/17, 25

[56] References Cited
UNITED STATES PATENTS

| | | | |
|---|---|---|---|
| 2,345,067 | 3/1944 | Osann | 266/25 |
| 2,533,142 | 12/1950 | Royster | 432/14 |
| 2,627,399 | 2/1953 | DeVaney | 432/14 |
| 2,630,373 | 3/1953 | Grossman | 432/14 |
| 2,670,946 | 3/1954 | Royster | 266/25 |
| 2,676,095 | 4/1954 | DeVaney et al. | 266/25 |
| 2,790,711 | 4/1957 | Sellers et al. | 266/25 |
| 2,996,292 | 8/1961 | Graf et al. | 432/14 |
| 3,140,864 | 7/1964 | Lellep | 432/15 |
| 3,392,969 | 7/1968 | Muller | 432/99 |
| 3,770,369 | 11/1973 | Mikami et al. | 432/15 |

*Primary Examiner*—John J. Camby
*Assistant Examiner*—Henry C. Yuen
*Attorney, Agent, or Firm*—Larson, Taylor and Hinds

[57] ABSTRACT

In a method for melting a material in a vertical shaft furnace having an upper portion, a lower combustion zone portion and an intermediate post-burning portion, said upper and lower portions being separated by a restriction and wherein coke is burned and the material melted in said lower combustion zone by introducing a blast of air close to the bottom of the lower combustion zone to produce combustion gases containing CO and/or $H_2S$, the improvement which comprises providing a slurry covered coke to said lower combustion zone for combustion and directing the combustion gases resulting from the combustion of said slurry covered coke to said intermediate post-burning portion and post-burning said combustion gases by introducing into said combustion gases a second blast of air at a level above the point of introduction of said first blast of air at which formation of CO normally has ceased and where the temperature of the mixture of combustion gases and air is sufficiently high so that said mixture is self-igniting. Preferably the post-burning portion is effected in a chamber outside the shaft furnace and a portion of the resulting combustion gases is reintroduced into the upper portion.

11 Claims, 1 Drawing Figure

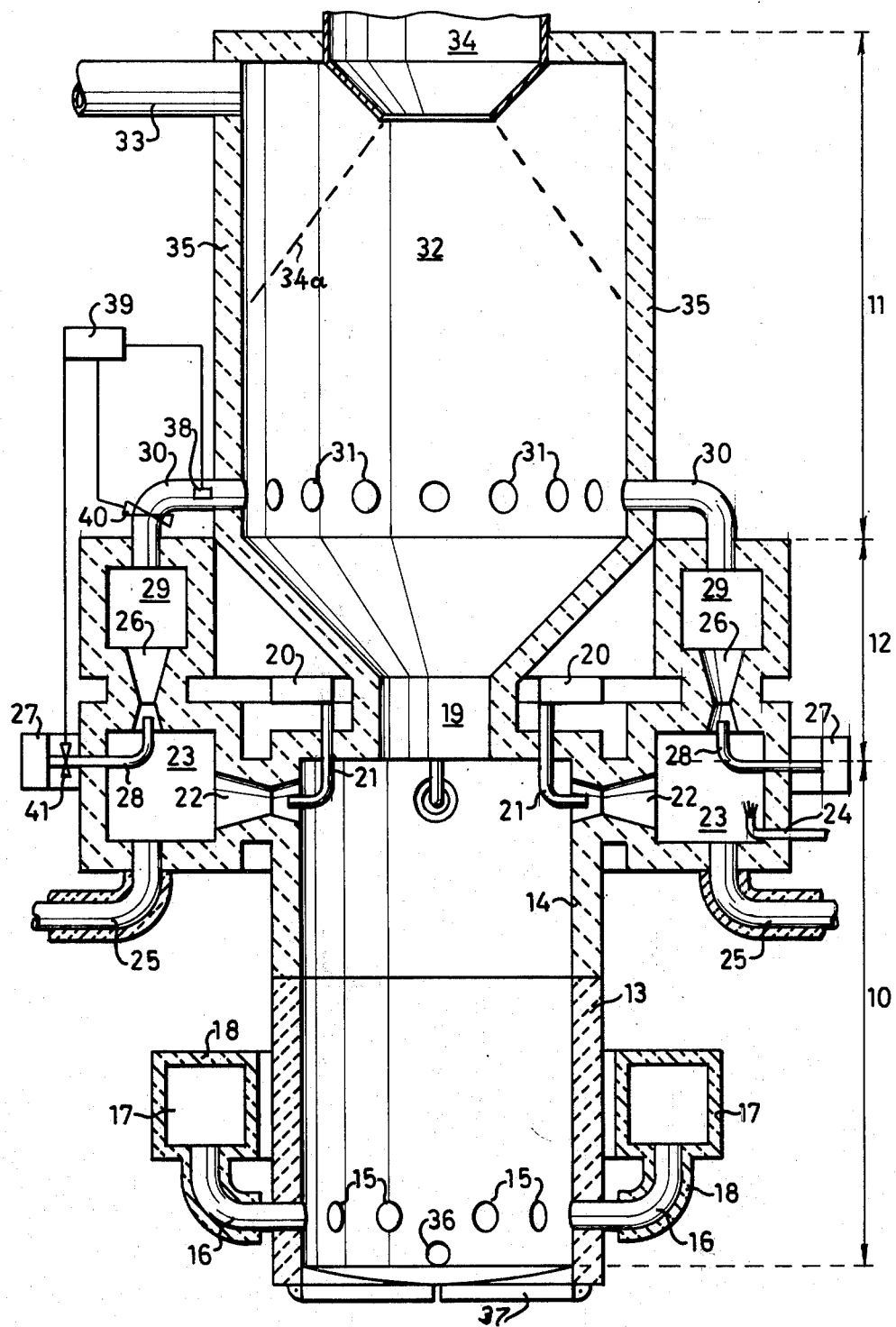

METHOD AT MELTING IN A SHAFT FURNACE

In melting of different kinds of materials, especially minerals and thereby, as a chosen example, melting of stone, slags or the like for obtaining a meltdown, which can be spun into mineral wool, one has hitherto practically exclusively used shaft ovens and cupola furnaces. Furnaces of this type, further, have got their most extensive use in connection with melting of iron but also for melting of other metals in the production of different kinds of alloys.

It is known from experience, that such furnaces do not satisfy all of the different demands at equal rate, which may be put upon them in connection with their use. For instance, they require a very great consumption of fuel. This depends upon the rising combustion gases certainly initially as to their substantial part comprising carbon dioxide ($CO_2$), but during their upward movement they will meet with fuel (C) which has not yet been burnt, usually in the form of coke, whereby a reduction takes place under formation of carbon monoxide (CO).

CO further contains an essential amount of energy, which would be possible to make use of by combustion under formation of further $CO_2$, and reduction under formation of CO also means a consumption of part of the C, which could better have been used as fuel in the melting zone of the furnace.

These two circumstances must be regarded the most obvious disadvantages in the elder furnaces, but they also suffer from further disadvantages. The CO formed as a rule has been let out into the atmosphere. It is strongly poisonous and therefore has meant an environment injuring matter.

As a rule, further, coke also contains given quantities of sulphur (S). Also the main part of this S is burnt in the melting zone forming sulphur dioxide ($SO_2$). However, one cannot prevent that also a reduction of $SO_2$ will take place under influence of the existing $H_2O$ in the combustion gases, and at the last mentioned reduction hydrogen sulfide ($H_2S$) is formed. The oxygen, thereby released, will react with the glowing coke under formation of further CO. Certainly, $H_2S$ is also strongly poisonous per se, but it exists in so small amounts that it's poisonous action may as a rule be disregarded. Serious is, however, the intensive and disagreable odour, which is carried by $H_2S$, even when this exists at very small quantities, and which is conceived as a great disadvantage.

Therefore, one should try to find some kind of a compromise, in which the quantity of CO as well as the quantity of $H_2S$ is decreased, in order that the demands of the environment should be well satisfied, simultaneously as the economical demands on execution should also be satisfied. Thereby it should be observed that is has proved in practice that there is a given relation, not fully clarified, between the quantity of CO and the quantity of $H_2S$ in the combustion gases, so that one will by steps, causing a decrease of the formation of CO or a decrease of the quantity of remaining CO in the combustion gases, as a rule also achieve a given decrease of the formation of $H_2S$ or of the quantity of $H_2S$ remaining in the combustion gases, respectively. It would therefore be possible in this way with means, known per se, to decrease the amount of remaining CO and $H_2S$ so far that the danger for environment injuring due to remaining amount of CO could be regarded substantially removed, but due to the intensive odour of $H_2S$, at this decrease, there will still remain such a strong odour that this is conceived as an environment injuring matter.

It is obvious that there is a considerable problem due to this in connection with the use of cupola furnaces and shaft furnaces. There have therefore also been several proposes to get the said disadvantages removed.

For instance it has been proposed to use two concentrical or parallel shafts and to feed coke for combustion and creation of temperature in one way and the material to be molten at the increased temperature in another way, and to remove the combustion gases exclusively through the channel, in which the material to be molten is fed. By this, one would thus prevent that the combustion gases get directly in contact with charged coke, and the above mentioned reduction would therefore not be created. This method, however has not given any good results. In first place one will meet with practically inavoidable constructive and material technical problems.

It has also been proposed to add combustion air in several different levels, and one has thereby believed that combustion air, which is fed at a rather high level would cause combustion of the created CO. However, nor has this method given any results in the said respect, acceptable in practice, because even if one could accidentally in this way decrease the contents of CO, before the combustion gases are let out in the atmosphere, nevertheless thereafter again new CO will be formed. Even if therefore cupola furnaces with several blast air levels have amongst other given higher capacity and a decreased consumption of fuel, the composition of the flue gases has not been essentially changed.

One way, which has got a given success, however only a limited scope of use, has been to prevent reaction between the coke moving downwardly, on the one side, and $CO_2$ moving upwardly, on the other side, for formation of CO, by providing the coke pieces with a protection cover of some material of rather high melting point. This step is subject of the Swedish Pat. No. 348,710. According to the invention forming subject matter of this patent, one will thus provide the picces of coke, fed to the shaft furnace as source of heat, before being fed to the shaft furnace with a surface layer having a melting point, which is high in relation to the temperatures existing in the shaft furnace outside of the combustion zone proper.

The pieces of coke therefore may be dipped into or sprayed with a slurry or the like, whereafter the layer thus added is completely or partially dried before charging the coke to the shaft furnace. When adding the slurry one may also introduce a binding means, giving better strength to the protection layer obtained.

The protection cover added in this way is then not molten until the coke has got into the melting zone, where $CO_2$ is formed, but the rising gas is not expected to penetrate the layer in the protection cover not yet molten, and one believed thereby to be capable of preventing the said reaction. In practice, however, this does not completely stick. The coke is, during its movement through the shaft in the shaft furnace subject to a movement under friction and pushes between the separate pieces of coke, and under influence of this mechanical strain at least in spots, the protection cover is destroyed. Similar damages of the protection cover may, to a still higher degree, be created when handling the coke after adding the protection cover, especially during the transfer of the coke to the shaft of the furnace.

To this add that the primary combustion in the lower part of the shaft furnace due to the complicated reaction kinetics in spite of the high temperature must create the formation of both $CO_2$ and CO. Certainly, the method will give a marked decrease of the contents of CO in the flue gases. The simultaneous decrease of contents of $H_2S$, however, is clearly insufficient.

Therefore one had only to state that one has up to this date not had success in finding any reliable way in connection with the combustion in a shaft oven, to eliminate the above explained disadvantages.

One has therefore proposed two further steps for this purpose, which do not directly refer to the combustion procedure in the furnace shaft proper.

Thus one has proposed the use of very high chimneys, by which the combustion gases are carried away. One believed hereby immediately to delute the environment injuring combustion gases. Due to the penetrative odour of $H_2S$, however, it is required in order that this method could cause any observable effect, that the chimnies are extremely high, usually having a height of more than 100 meters, which cause a building technical disadvantage, cooperating with the high costs for such a chimney.

It has also been proposed to use specific post-combustion apparatus, through which the flue gases are carried away, and in which one should subject the existing CO and $H_2S$ to a post-combustion under formation of $CO_2$ and $SO_2$. Thereby, the disturbing effect of the gases is eliminated to a sufficient degree. By adding combustion air and heat, the latter one for instance obtained from an oil burner, one would thus create a practically complete post-combustion of CO as well as of $H_2S$.

This method theoretically appears to be very appealing, but it has rather a lot of practical disadvantages. Either, one will have to use so much of post-combustion fuel that the method will be in-acceptable due to execution echonomical reasons, or one has to use very great, heavy and space-consuming post-combustion chambers, which allow for combustion at low temperature, and the investment in these machinery arrangements will therefore be burdensome. Thereby, one should also keep in mind that one must, of course, in first place try to cause such a complete combustion as ever possible at the primary combustion, but the more complete this one is, the less is the quantity of CO and $H_2S$ in the combustion gases, and thereby the mean for fuel in the post-combustion system will increase to a corresponding degree, because this fuel must heat all of the quantity of gas into combustion temperature, independently of how great the content of non-burnt gases is.

Thus, it is obvious that very great problems exist when firing in a shaft furnace in order of melting minerals, metals and the like, and these problems have up to this date found no satisfactory solution.

The present invention, which is based upon an intricate investigation of the technology of combustion in shaft ovens, however shows a solution. Thereby one got to the idea that the addition of secondary combustion air should not take place until the reduction of $CO_2$ into CO and the reduction of $SO_2$ along with $H_2O$ into $H_2S$, which takes place at about the same interval of temperature, has been completed, and no such reduction should any more be expected, or at least until the reduction has been decreased so strongly that the remaining reduction does not cause any observable disadvantage.

Further one started from the principle that the said post-combustion must not be of such a kind, that it disturbs the high temperature processes in the shaft furnace. In addition thereto one started from the point, that the post-combustion shall not take place at such a late time, that the flue gases have had time to get cold at any observable degree, because then there will be a difficulty again to ignite the post-combustion at the times, when this has perhaps, due to non-existence of combustable gases accidentally expired.

The said point of view therefore is an indication for that the post-combustion should take place rather close to the primary combustion zone, but it must also not take place too close to this zone, because in such a case there will be a risk for heat created at the post-combustion causing such an increase of the gas temperature that thereby a renewed reduction under formation of CO and perhaps also of $H_2S$ would be impossible to prevent. On the other side, one must not depart too far from the primary combustion zone, because in such a case the temperature of the gases, have decreased so far that ignition of the gas mixture not at all or only with difficulty may take place.

Finally, one has also found that one should use such coke, which has been provided with a protection cover according to the above. Already the existance of this protection cover causes an essential decrease of the nondesired gasous constituents CO and $H_2S$. The protection cover can be added with rather simple means and may further give other advantages. These gasous constituents in turn should be made undangerous by feeding combustion air in a specific way, whereby the protection cover, and this is the main task thereof, shall prevent a renewed formation of CO and $H_2S$. The mechanism thereby is a double one. Firstly the coke is prevented from reducing $CO_2$ into CO, and secondly the starting combustion of the coke by means of the oxygene in the blast air fed at last is prevented. Such a combustion, as a matter of fact, would increase the temperature, so that the formation of CO would start anew.

Therefore, one here is put before a technical problem of compromise, which, however, easily may be solved by the solutions, indicated by the present invention.

In solving the said problem of compromise and at the execution of its solution according to the present invention however, one will also meet with certain secondary problems. Amongst these the following ones may be mentioned:

The introduction of combustion air into a shaft oven scarcely can take place under such an homogenous distribution of the combustion air as desired, because the charge in the furnace will act preventing for such a homogenous distribution. For the same reason it may be difficult, especially at greater shaft ovens, to cause an homogenous distribution of the secondary air over the cross-section of the shaft oven, but the desired combustion of CO can only take place with a minimum of added secondary combustion air, if this is extremely homogenously distributed over the cross-section of the furnace. This problem, only in part, can be controlled by choice of suitable speeds of inward movement, because the amount and thereby also the speed must be possible to be varied. An essentially more suitable way then would be to conduct the combustion gases away from the furnace shaft, to mix them with secondary air for the post-combustion, and cause the post-combustion to take place, and thereafter anew to direct the combustion gases into the furnace shaft. By this one will gain full control over the combustion procedure, simultaneously as one may, by simple means, keep the temperature of the final combustion gases on a suitable level.

It is not necessary that all of the amount of combustion gases is reintroduced into the furnace shaft, but partial amounts may in a way, known per se, be used for all different kinds of side tasks, e.g. for pre-heating of the blast air to the furnace and so on.

If one removes the combustion gases from the shaft and treats them outside of the shaft, one will gain the further advantage that one can work with two separate steps, viz. firstly a pre-combustion step, and thereafter a cooling step. Both of these steps thereby may, independently of each other, be driven under optimal conditions, whereby one has further in the hand to improve the chemical exchange at the combustion. It is not always necessary or necessary for any different purpose, that the cooling step is in function.

Of course, from the fuel echonomical point, it is important that as great a participation as possible and preferably all of the upwardly moving gas, created at the combustion, is collected. This is made possible, if one provides for a constriction of the furnace shaft immediately above the place of removal of the gases. In order of making sure that no gas will move up through the constriction, thereby carrying with it non-burnt CO and/or $H_2S$, one may by specific means increase the difference of pressure between the removal openings and the inlet openings in the shaft, so that one may even obtain a given downward movement of the secondary combustion gases through the constriction.

The invention thus refers in first place to a method for melting in a shaft oven a material, e.g. such material which is used for the production of mineral wool, under combustion of coke. Blast air for the combustion of this coke is fed through tuyeres close to the bottom of the furnace.

According to the invention, CO and/or $H_2S$, created during the combustion of the coke, is post-burnt under reaction between the flue gases, on the one side, and a blast air, separated therefrom, which is fed at a level, essentially above the one, where the first mentioned blast air is fed, on the other side. The further blast air thereby is fed at a level, at which formation of CO has at least substantially ceased, and where the temperature is still so high that the mixture of gas and air is self-igniting.

According to a further form of execution of this invention, as fuel such coke is used, which has in a way, known per se, been provided with a protection cover having a melting point, which is high in relation to the temperature existing in the shaft furnace outside of the combustion zone proper.

The invention, however, also refers to a shaft furnace for the execution of the said method.

According to this part of the invention, the shaft furnace contains a lower part for causing the combustion proper and an upper part for the post-combustion, separated by a constriction. At a place within the lower part, arrangements are provided for collecting the combustion gases and mixing them with further combustion air, and a channel is provided for a re-introduction of the mixture of combustion gases and further combustion air to a place above the constriction. In the way of the combustion gases thus collected, pressure increasing apparatus are provided, preferably in the form of ejectors.

The invention will be further described below in connection with one form of execution, shown in the attached drawing, but it is understood that the invention shall not be limited to this specific form of execution, but that all different kinds of modifications may occur within the frame of the invention.

In the drawing, thus, a shaft furnace is shown, made for the execution of the method according to the present invention.

The furnace shaft comprises two main parts, viz. a lower part 10 and an upper part 11, separated by means of such a constriction 12 as mentioned above. In the lower range of the lower part 10, a jacket 13 is provided, made from a high value refractory material or having water cooling. Above this jacket, the furnace shaft 14 is applied, made for instance from brick work. Tuyeres 15 are arranged in the lowermost part of the range 13 for feeding blast air through channels 16, which are fed from a blast air casing 17 running around the furnace. As it is an advantage, that this blast air is pre-heated, the blast chamber 17 as well as the channels 16 should be heat insulated, as indicated by means of the insulation layers 18.

For removal of the combustion gases from the furnace, an ejector device is made, ejector air being fed through tubes 21 from an air distribution chamber 20, arranged around the constriction place 19, said tubes opening into the constriction place in the ejector nozzles 22, so that the combustion gases along with the driving air is collected in the surrounding chamber 23, in which further ignition burners 24 are provided in order, if the combustion due to accidental lack of combustable material such as CO or $H_2S$, should extinguish, this combustion should again be ignited, when combustable material in sufficient amount is again present. Part of the combustion gases may be removed from the surrounding chamber 23 through tubes 25 and will then be conducted for instance to a heat exchanger for heating blast air or the like. From the same chamber 23, at least part of the combustion gases are conducted upwardly, for instance through an ejector nozzle 26, and by means of driving air under pressure, fed from a connection channel 27 and through the driver nozzles 28 to the collection chamber 29, which, similarily to the remaining air or gas chambers in the arrangements is suitably made annular and surrounds the furnace. It should be mentioned that, when there has been spoken above about driving air for the ejector devices, it is not meant thereby that it must necessarily be air in the sense proper but that one may with equal advantage use any other gas under pressure, e.g. combustion gases, when such gases are at disposal, especially in other ejectors perhaps existing. For many purposes it is also advantageous at the production of this driving air to add water in such a form that the driving air will be provided in the combustion chamber 23 with water steam at an adapted degree for catalysis of the combustion of CO in the combustion chamber 29 in order of cooling the gas mixture.

From the collection chamber 29 tubes 30 are leading to holes 31 in the bottom of the upper furnace part 11 above the constriction 19. Through these tubes thus combustion gases from the chamber 29 are fed. The amount of such combustion gases is chosen in such a way that one will get a suitable pre-heating of the material to be molten in a shaft 32 within the upper furnace part 11. Finally, the combustion gases thus treated are removed from the furnace shaft by means of a tube conduit 33, after they have passed through the charged material, which is filled on through the shaft opening 34. The upper surface of said material is indicated by the contour line 34a.

It should be observed that for improving of the heat echonomy in the furnace this may be surrounded as a hole by means of a heat insulating material in the form of the walls 35, which also enclose the auxilliary chambers and channels to a desired extension.

The arrangement now described functions in the following way:

During the combustion taking place in the combustion zone proper within the lower range of the part 10 of the furnace, the charge material sinks downwardly in the shaft 11. It is pre-heated during all of this period of time due to the rising hot gases, fed in through the holes 31, and as these gases move in counter-current to the decreasing charge material, this material will show a higher temperature, the further downwardly in the shaft 11 they are. If it should, for instance, be a question about a shaft furnace for melting mineral for the production of mineral wool, said mineral is fed through the shaft thunnel 34 mixed with fuel, for instance coke. The meltdown is thereafter collected in the lowermost level within the part 13 in order to be tapped off through openings 36, which are arranged above the bottom shutters 37.

In the flue gases from the melting zone there will exist both CO and $H_2S$. These are the non-desired gasous products, which should be burnt according to the present inventioin. For this combustion it is required firstly that in the place of post-combustion there is an adapted temperature, and secondly also that in this place there exists an oxygenous air or the corresponding. The combustion shall mainly take place by means of air, which is introduced into the collection channel 20 by means of the ejector nozzles 21. The temperature of the resulting combustion gas is controlled e.g. by addition of colder combustion gases through the nozzles 28. The distribution and the quantity of this gas mixture is controlled in some suitable way, preferably by temperature sensing means 38 in the tube conduit 30, which give pulses for the control of a counter or a calculator 39, said means in turn influencing valves 41 in the tube conduits 28. Only one such valve has been shown in the tube conduit in the drawing, but it is obvious that one may provide a plurality of such valves, and also that one may provide the valves in other places of the system, whereby one has, however, to take care of that they will in common control the quantity and the temperature of the post-combustion air, fed through the holes 31. In the conduits 30 further valves 40 have been introduced for controlling the amount of gas re-introduced into the furnace shaft.

How this post-combustion takes place will be evident from the above. Thereby it is important that one could separate the combustion chamber proper in the lower part 10 of the shaft furnace from the post-combustion chamber in the upper part 11 of the shaft oven, which took place by the constriction, found in the intermediate part 12 of the shaft furnace. This constriction causes the rising flue gases more easily to deviate through the ejector arrangement 21, 22 to the annular chamber 23, simultaneously as all of the combustion and the pressure state existing thereby is stabilized in a way, which makes the following control of the quantity and the temperature of the post-combustion air much easier.

I claim:

1. In a method for melting a material in a vertical shaft furnace having an upper portion, a lower combustion zone portion and an intermediate post-burning portion, said upper and lower portions being separated by a restriction and wherein coke is burned and the material melted in said lower combustion zone by introducing a blast of air close to the bottom of the lower combustion zone to produce combustion gases containing CO and/or $H_2S$, the improvement which comprises providing a slurry covered coke to said lower combustion zone for combustion and directing the combustion gases resulting from the combustion of said slurry covered coke to said intermediate post-burning portion and post-burning said combustion gases by introducing into said combustion gases a second blast of air at a level above the point of introduction of said first blast of air at which formation of CO normally has ceased and where the temperature of the mixture of combustion gases and air is sufficiently high so that said mixture is self-igniting.

2. The improvement according to claim 1 wherein said post-burning portion is a post-burning chamber outside of said shaft furnace and at least a portion of said combustion gases containing CO and/or $H_2S$ are directed to said post-burning chamber, separately introducing into said post-burning chamber said second blast of air at a level above the point of introduction of said first blast of air at which formation of CO has ceased and where the temperature is sufficiently high so that the mixture is self-igniting and finally reintroducing at least part of said post-burned gases into said upper portion of the shaft furnace.

3. A method according to claim 1 whereby the second blast of air is added to said post-burning in order to complete combustion of CO in said combustion gases without creating heat that causes a rise of temperature of such an order of a magnitude that effect a renewed observable reduction of $CO_2$ to CO.

4. A method according to claim 1 wherein the mixture of combustion gases and second blast of air is fed at an increased pressure at the place of the pre-heating.

5. A method according to claim 4 wherein the pressure is sufficient when re-entering the upper portion of said furnace shaft to overcome the pressure of rising combustion gases.

6. A method according to claim 1 wherein the entire CO in the combustion gases is burned before they are returned to the upper portion of the furnace shaft.

7. A method according to claim 6 wherein colder gases are fed to said post-burning to dilute and cool said gases.

8. A method according to claim 1 wherein the temperature of the combustion gases, re-introduced into the upper portion of the furnace shaft is limited by mixing therewith smoke gases from the furnace proper.

9. A method according to claim 1 wherein ejectors are used in series one after the other for transferring combustion gases from the lower combustion zone portion of the furnace shaft to the upper portion of the furnace shaft.

10. A method according to claim 1 wherein the temperature and the quantity of the combustion gases introduced for preheating the charge and the temperature and the quantity of the second blast of air are conrolled to complete combustion of the CO without creating a rise in temperature to an order of magnitude that effects a renewed reduction of $CO_2$ to CO.

11. A method according to claim 10 wherein the control of the temperature of the gases takes place by introducing into the gases water, steam or a mixture thereof.

* * * * *